(12) United States Patent
Jeong et al.

(10) Patent No.: US 10,341,951 B2
(45) Date of Patent: *Jul. 2, 2019

(54) METHOD FOR COMMUNICATING ENCODED TRAFFIC INDICATION MAP INFORMATION

(71) Applicant: KT Corporation, Seongnam-si (KR)

(72) Inventors: Yang Seok Jeong, Seoul (KR); Joo Young Kim, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,639

(22) Filed: Apr. 23, 2018

(65) Prior Publication Data

US 2018/0242244 A1    Aug. 23, 2018

Related U.S. Application Data

(63) Continuation of application No. 14/406,576, filed as application No. PCT/KR2013/005104 on Jun. 11, 2013.

(30) Foreign Application Priority Data

Jun. 13, 2012  (KR) .................. 10-2012-0063372
Mar. 12, 2013  (KR) .................. 10-2013-0025959

(51) Int. Cl.
*H04W 72/04*      (2009.01)
*H04W 52/02*      (2009.01)
(Continued)

(52) U.S. Cl.
CPC .......... *H04W 52/0216* (2013.01); *H04B 7/26* (2013.01); *H04W 24/02* (2013.01);
(Continued)

(58) Field of Classification Search
CPC ... H04W 52/02; H04W 24/02; H04W 72/042; H04B 7/26
See application file for complete search history.

(56) References Cited

U.S. PATENT DOCUMENTS

2006/0088019 A1   4/2006  Liebsch
2008/0146253 A1   6/2008  Wentink
(Continued)

FOREIGN PATENT DOCUMENTS

JP       4319654 B2       8/2009
JP       2011501488 A     1/2011
(Continued)

OTHER PUBLICATIONS

Minyoung Park et al: "TGah Efficient TIM Encoding Name Affiliations Address Phon email", Mar. 14, 2012.
(Continued)

*Primary Examiner* — Chi Ho A Lee
(74) *Attorney, Agent, or Firm* — Sughrue Mion, PLLC

(57) ABSTRACT

Provided is a method of communicating encoded traffic indication map (TIM) information that can reduce power consumption by reducing an unnecessary decoding process. A method of receiving, by a terminal, a TIM that is encoded in a hierarchical structure including a page, a block, and a sub-block includes receiving an encoded TIM from an access point (AP), extracting a page index from the encoded TIM, and extracting block bitmap information indicating whether blocks included in a page designated by the page index include a bitmap. Therefore, an unnecessary decoding process with respect to each delivery traffic indication map (DTIM) beacon can be reduced, thereby reducing power consumption of a low-power terminal.

7 Claims, 6 Drawing Sheets

(51) Int. Cl.
   *H04W 24/02* (2009.01)
   *H04B 7/26* (2006.01)
(52) U.S. Cl.
   CPC ........... *H04W 72/042* (2013.01); *Y02D 70/00* (2018.01); *Y02D 70/142* (2018.01); *Y02D 70/144* (2018.01)

(56) References Cited

U.S. PATENT DOCUMENTS

| | | | |
|---|---|---|---|
| 2009/0016306 | A1 | 1/2009 | Wang et al. |
| 2010/0265864 | A1 | 10/2010 | He et al. |
| 2013/0294261 | A1 | 11/2013 | Ghosh et al. |
| 2014/0204960 | A1 | 7/2014 | Park et al. |

FOREIGN PATENT DOCUMENTS

| | | | |
|---|---|---|---|
| JP | 5054786 | B2 | 10/2012 |
| JP | 5456488 | B2 | 3/2014 |
| KR | 10-2005-0120521 | A | 12/2005 |
| KR | 10-2006-0040243 | A | 5/2006 |
| KR | 10-2007-0022096 | A | 2/2007 |
| KR | 10-2010-0095524 | A | 8/2010 |
| WO | 2004/105374 | A2 | 12/2004 |
| WO | 2008104095 | A1 | 9/2008 |
| WO | 2008109403 | A1 | 9/2008 |
| WO | 2008016253 | A2 | 12/2008 |
| WO | 2009/047179 | A1 | 4/2009 |

OTHER PUBLICATIONS

Minyoung Park et al., "TGah Efficient TIM Encoding", Intel Corp., May 14, 2012, IEEE 802.11-12/388r2, total 16 pages.
Zhou et al: "Extension of AID and TIM to Support 6000 STAs in 802.11ah", IEEE 802.11-11/1550R1, Nov. 8, 2011, pp. 1-9.
Yuan Zhou et al., "Extension of AID and TIM to Support 6000 STAs in 802.11ah", IEEE 802.11-11/1550r1, Singapore, Nov. 8, 2011.
International Search Report of PCT/KR2013/005104 dated Oct. 21, 2013 [PCT/ISA/210].
Written Opinion of PCT/KR2013/005104 dated Oct. 21, 2013 [PCT/ISA/237].

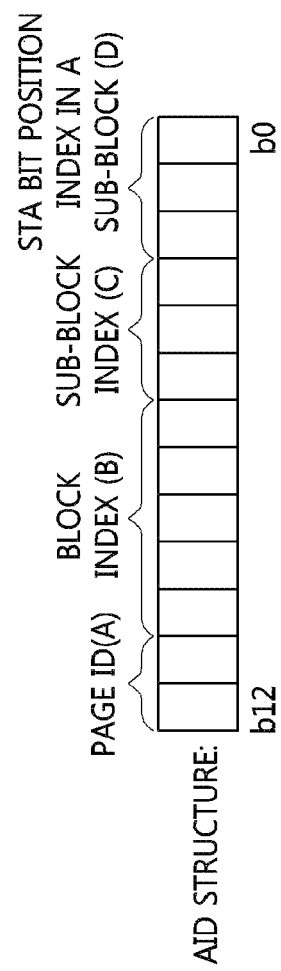

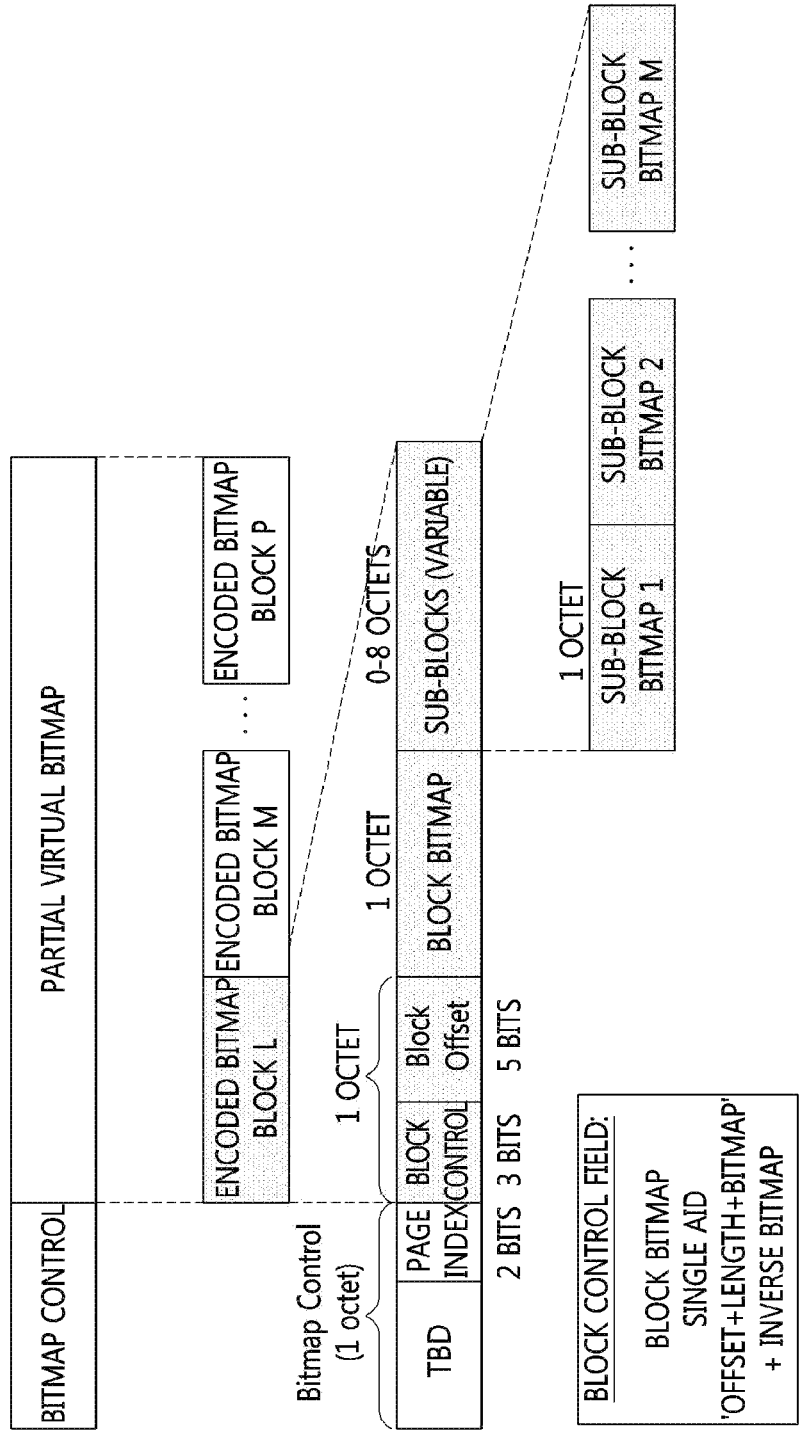

METHOD FOR COMMUNICATING ENCODED TRAFFIC INDICATION MAP INFORMATION

CROSS-REFERENCE TO RELATED APPLICATIONS

This is a continuation of U.S. patent application Ser. No. 14/406,576, filed Dec. 9, 2014, which is a National Stage Application of PCT/KR2013/005104 filed Jun. 11, 2013, and claims priority from Korean Application No. 10-2013-0025959 filed Mar. 12, 2013 and Korean Application No. 10-2012-0063372 filed Jun. 13, 2012. The entire disclosures of the prior applications are considered part of the disclosure of the accompanying continuation application, and are hereby incorporated by reference in their entireties.

TECHNICAL FIELD

The present invention relates to wireless communication technology, and more particularly, to a method of communicating encoded traffic indication map (TIM) information that can reduce power consumption by reducing an unnecessary decoding process.

BACKGROUND ART

With the development of information communication technologies, a variety of wireless communication technologies have been developed. Among these technologies, wireless local area network (WLAN) is a technology that Internet access is possible in a wireless way in homes, business or specific service providing areas, using portable terminal such as personal digital assistant (PDA), a laptop computer, a portable multimedia player (PMP), or the like, based on wireless frequency technologies.

WLAN technologies is created and standardized by the IEEE 802.11 Working Group under IEEE 802 Standard Committee. IEEE 802.11a provides a maximum PHY data rate of 54 Mbps using an 5 GHz unlicensed band. IEEE 802.11b provides a maximum PHY data rate of 11 Mbps by applying a direct sequence spread spectrum (DSSS) modulation at 2.4 GHz. IEEE 802.11g provides a maximum PHY data rate of 54 Mbps by applying orthogonal frequency division multiplexing (OFDM) at 2.4 GHz. IEEE 802.11n provides a PHY data rate of 300 Mbps using two spatial streams and bandwidth of 40 MHz, and provides a PHY data rate of 600 Mbps using four spatial streams and bandwidth of 40 MHz.

As such WLAN technology becomes more prevalent and its applications become more diverse, there is increasing demand for new WLAN technology that can support a higher throughput than IEEE 802.11n. Very high throughput (VHT) WLAN technology, that is one of the IEEE 802.11 WLAN technologies, is proposed to support a data rate of 1 Gbps and higher. IEEE 802.11ac has been developed as a standard for providing VHT in the 5 GHz band, and IEEE 802.11ad has been developed as a standard for providing VHT in the 60 GHz band.

In a system based on such WLAN technology, an access point (AP) sets bits corresponding to an association ID (AID) of each terminal in a bitmap control and a partial virtual bitmap among traffic indication map (TIM) elements of a beacon when there is data to be transmitted to the terminal, whereby the terminal can determine whether there is data to be transmitted.

Since a length field of a TIM element format has 1 octet, the partial virtual bitmap may have up to a maximum of 251 octets, and therefore a total of 2007 terminals (8251-1) can be expressed.

Meanwhile, in order to express and manage at least 2007 terminals as a TIM bitmap, a method of encoding the TIM bitmap in units of blocks while having a hierarchical AID structure has been proposed.

Here, a page ID is displayed in an existing bitmap control, and encoded bitmap blocks are continuously displayed in units of blocks in the partial virtual bitmap.

In addition, a single encoded bitmap block includes a block control of 3 bits, a block offset of 5 bits, a fixed length part of 2 octets including a block bitmap of 1 octet, and a sub-block bitmap part having a variable length.

However, in order for a terminal in an N-th block (N is a natural number greater than 1) to determine whether a TIM bit of the terminal is set, a position of a block control of the N-th block has to be found, and an actual position of the bitmap has to be determined in accordance with a block encoding mode. In addition, since each block has a variable length, a position of an N-th block control cannot be found from a fixed position, and blocks from a first block to an (N−1)-th block have to be sequentially decoded.

That is, when there is actual data to be transmitted, bitmaps of all blocks should be all decoded, but in an environment in which a small amount of data is intermittently transmitted, such as a sensor network, there is a problem in that all blocks have to be decoded with respect to all delivery traffic indication map (DTIM) beacons in order to determine the presence or absence of data even though there is no data.

DISCLOSURE

Technical Problem

The present invention is directed to providing a method of receiving encoded traffic indication map (TIM) information that can reduce power consumption by reducing an unnecessary decoding process.

The present invention is also directed to providing a method of transmitting encoded TIM information that can reduce power consumption by reducing an unnecessary decoding process.

Technical Solution

One aspect of the present invention provides a method of receiving, by a terminal, a traffic indication map (TIM) that is encoded in a hierarchical structure including a page, a block, and a sub-block, the method including: receiving an encoded TIM from an access point (AP); extracting a page index from the encoded TIM; and extracting block bitmap information indicating whether blocks included in a page designated by the page index include a bitmap.

Here, the block bitmap information may be positioned before bitmap information designating the block or the sub-block within the encoded TIM.

In addition, the method may further include decoding, when bits for designating a block including an association ID (AID) of the terminal are set in the extracted block bitmap information, a bitmap of the block including the AID of the terminal.

In addition, the method may further include stopping, when bits for designating a block including an AID of the terminal are not set in the extracted block bitmap information, decoding of a bitmap designating the block or the sub-block.

In addition, when the bits for designating the block including the AID of the terminal are not set in the extracted block bitmap information, the terminal may enter a power save mode without decoding the bitmap for designating the block or the sub-block.

Another aspect of the present invention provides a method of transmitting, by an AP, a TIM that is encoded in a hierarchical structure including a page, a block, and a sub-block, the method including: generating block bitmap information for designating whether blocks included in a page designed by a page index include a bitmap; generating a TIM including the page index and the block bitmap information; and transmitting the TIM to a terminal.

Here, the block bitmap information may be positioned before bitmap information for designating the block or the sub-block within the encoded TIM.

Advantageous Effects

According to the above-described method of communicating an encoded traffic indication map (TIM) information according to an embodiment of the present invention, a page index can be extracted from an encoded TIM received from an access point (AP), block bitmap information indicating whether blocks included in a page designated by the page index include a bitmap can be extracted, and then whether decoding can be performed in accordance with the bits for designating a block including an association ID (AID) of the terminal are set in the extracted block bitmap information can be determined in advance.

Accordingly, it can be determined whether decoding of the entire TIM map is performed by reading only a block bitmap part of a delivery traffic indication map (DTIM) beacon. Therefore, it is possible to reduce power consumption of the terminal by reducing an unnecessary decoding process with respect to each DTIM beacon.

DESCRIPTION OF DRAWINGS

FIG. 1 shows a traffic indication map (TIM) element format of a beacon;

FIG. 2 shows a hierarchical association ID (AID) structure;

FIG. 3 shows an encoded TIM in units of blocks;

MODE FOR INVENTION

Figure 4:
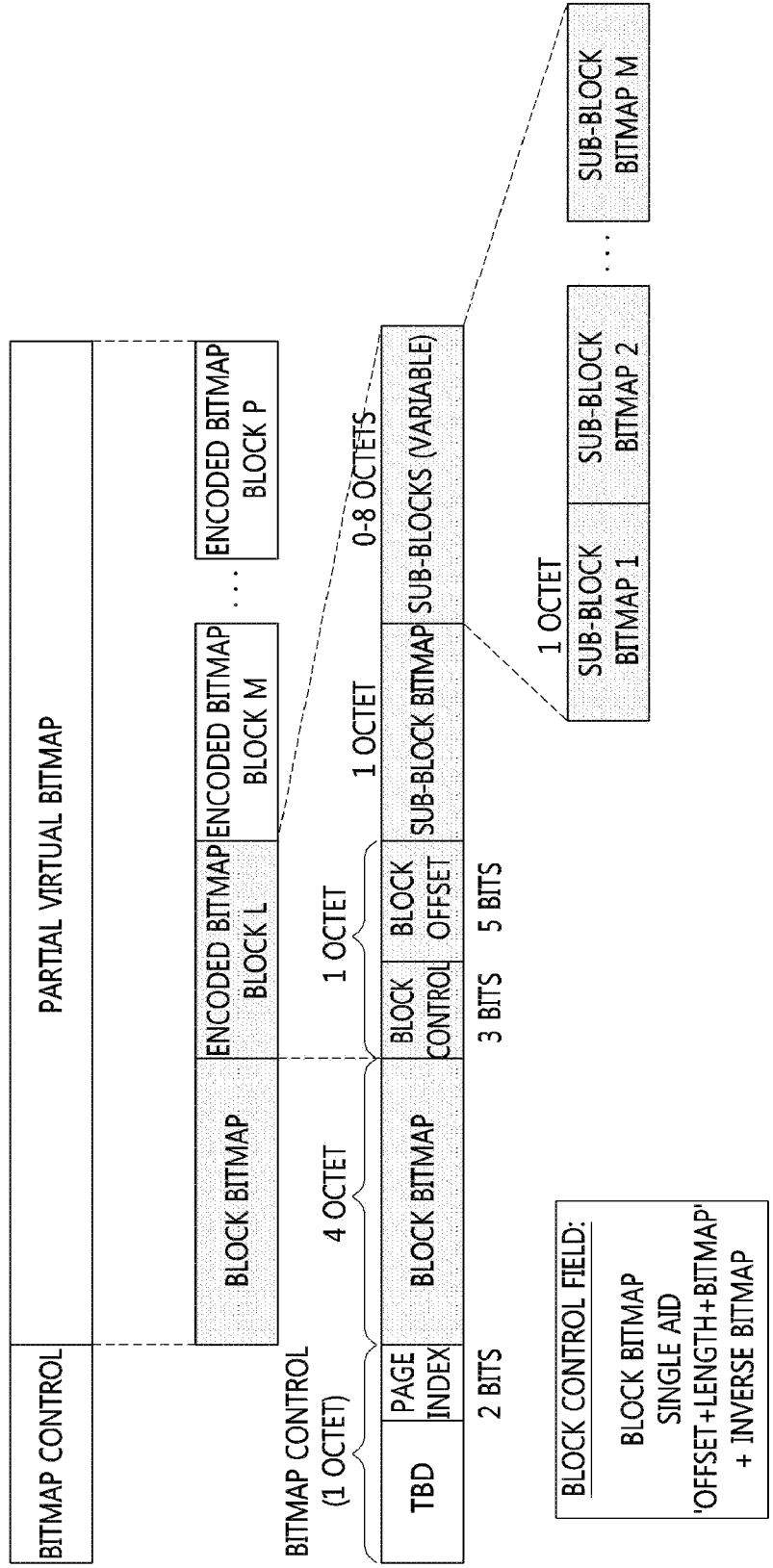
FIG. 4 shows TIM bitmap encoding in units of blocks in which a block bitmap of 4 octets is added according to an embodiment of the present invention.

Hereinafter, exemplary embodiments of the present invention will be described in detail. However, the present invention is not limited to the exemplary embodiments disclosed below, but can be implemented in various forms.

The following exemplary embodiments are described in order to enable those of ordinary skill in the art to embody and practice the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used here, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present.

The terminology used herein is for the purpose of describing particular embodiments only and is not intended to be limiting of the invention. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Hereinafter, preferred embodiments of the present invention will be described in detail with the accompanying drawings. In the following description, the same reference numerals denote the same elements to facilitate the overall understanding, and repeated description thereof will be omitted.

In the specification, station (STA) denotes an arbitrary functional medium including a medium access control (MAC) layer defined by institute of Electrical and Electronics Engineers (IEEE) 802.11 standard, and a physical layer interface with respect to a wireless medium. STAs may be divided into STAs that are access points (APs) and STAs that are not APs. An STA that is an AP may be simply referred to as an AP, and an STA that is not an AP may be simply referred to as a terminal. The terminal may include a processor and a transceiver, and may further include a user interface, a display device, and the like. The processor denotes a unit that is designed to generate a frame to be transmitted through a wireless network or process a frame received through the wireless network, and performs a variety of functions for controlling the station (STA). The transceiver may be functionally connected with the processor, and denotes a unit that is designed to transmit and receive a frame through the wireless network for the STA.

The AP may refer to a centralized controller, a base station (BS), a Node-B, an eNode-B, a base transceiver system, a site controller, or the like, and may include some or all functions thereof.

The terminal may refer to a wireless transmit/receive unit (WTRU), user equipment (UE), a user terminal (UT), an access terminal (AT), a mobile station (MS), a mobile terminal, a subscriber unit, a subscriber station (SS), a wireless device, a mobile subscriber unit, or the like, and may include some or all functions thereof.

Here, the terminal may be a desktop computer enabling communication, a laptop computer, a tablet PC, a wireless phone, a mobile phone, a smart phone, an e-book reader, a portable multimedia player (PMP), a portable game console, a navigation device, a digital camera, a digital multimedia broadcasting (DMB) player, a digital audio recorder, a digital audio player, a digital picture recorder, a digital picture player, a digital video recorder, a digital video player, or the like.

A method of communicating encoded traffic indication map (TIM) information according to an embodiment of the present invention, which will be described later, may be applied to the above-described IEEE 802.11 wireless local area network (WLAN) system. It may further be applied to a variety of networks such as a wireless personal area network (WPAN), a wireless body area network (WBAN), and the like, as well as the IEEE 802.11 WLAN system.

FIG. 1 shows a traffic indication map (TIM) element format of a beacon, FIG. 2 shows a hierarchical association ID (AID) structure, and FIG. 3 shows an encoded TIM in units of blocks.

Referring to FIGS. 1 to 3, a TIM element format of a beacon in a WLAN system includes an element ID, a length, a delivery traffic indication map (DTIM) count, a DTIM period, a bitmap control, and a partial virtual bitmap.

An access point (AP) may set bits corresponding to an association ID (AID) of each terminal in the bitmap control and the partial virtual bitmap among the TIM elements of the beacon when there is data to be transmitted to a terminal, thereby indicating the presence of the data to be transmitted to the terminal.

Since a length field of the TIM element format has 1 octet, the partial virtual bitmap may have up to a maximum of 251 octets, and therefore a total of 2007 terminals (8251-1) can be expressed.

In addition, in order to express and manage at least 2007 terminals as a TIM bitmap, a method of encoding the TIM bitmap in units of blocks as shown in FIG. 3 while having a hierarchical AID structure shown in FIG. 2 has been proposed.

Specifically, referring to FIG. 3, in the proposed method of encoding the TIM bitmap in units of blocks, a page ID is displayed in an existing bitmap control, and encoded bitmap blocks are continuously displayed in units of blocks in the partial virtual bitmap.

In addition, a single encoded bitmap block includes a block control of 3 bits, a block offset of 5 bits, a fixed length part of 2 octets including a block bitmap of 1 octet, and a sub-block bitmap part having a variable length. Here, a block control field controls uses of the block bitmap and the sub-block bitmap field.

In addition, the block offset represents an offset value of a block.

In addition, the block bitmap represents a position bitmap of the sub-block on which AID bit setting is performed.

In addition, the sub-blocks represent a position bitmap of an AID within the sub-block.

In order for a terminal in an N-th block (N is a natural number greater than 1) to determine whether a TIM bit of the terminal is set, a position of a block control of the N-th block has to be found, and an actual position of the bitmap has to be determined in accordance with a block encoding mode.

In addition, since each block has a variable length, a position of an N-th block control cannot be found from a fixed position, and blocks from a first block to an (N−1)-th block have to be sequentially decoded.

That is, when there is actual data to be transmitted, bitmaps of all blocks should be all decoded, but in an environment in which a small amount of data is intermittently transmitted, such as a sensor network, there is a problem in that all blocks have to be decoded with respect to all delivery traffic indication map (DTIM) beacons in order to determine the presence or absence of data, even though there is no data.

Hereinafter, in order to solve the above-described problem, an embodiment of the present invention in which a terminal can determine that there is no data to be transmitted to the terminal, through only a part of TIM elements of a DTIM beacon, to thereby stop additional decoding, will be described with reference to the drawings.

Figure 5:
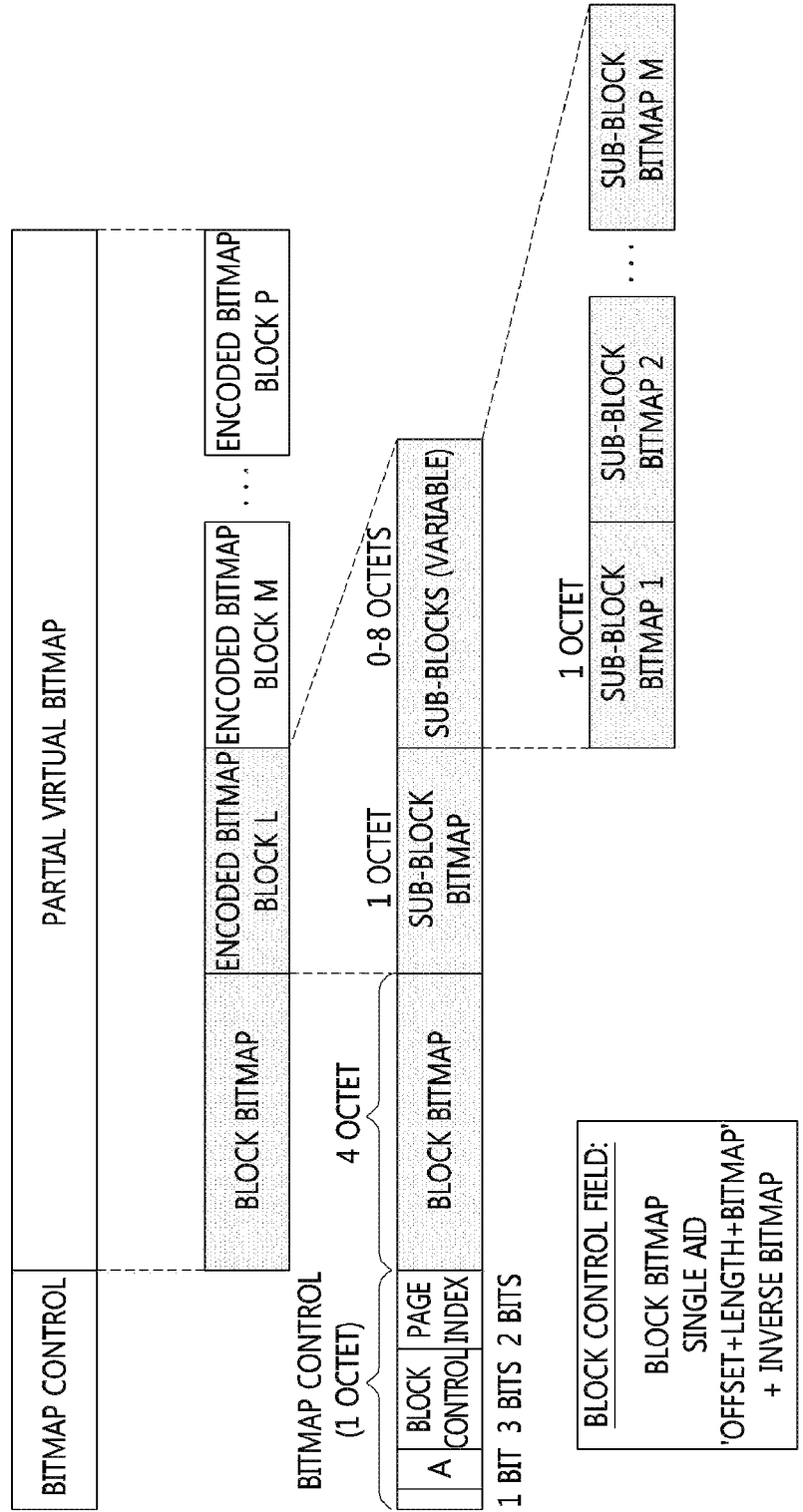
FIG. 5 shows a TIM encoding mode that adds a block bitmap of 4 octets and uses a common block control field according to an embodiment of the present invention.

FIG. 4 shows TIM bitmap encoding in units of blocks in which a block bitmap of 4 octets is added according to an embodiment of the present invention, and FIG. 5 shows a TIM encoding mode that adds a block bitmap of 4 octets and uses a block control field according to an embodiment of the present invention.

Referring to FIGS. 4 and 5, an embodiment of the present invention adds a block bitmap of 4 octets to a TIM bitmap.

That is, a terminal may primarily determine whether overall decoding of the block bitmap of the TIM element is performed based on a block index including of an AID of the terminal.

Here, the block bitmap refers to a bitmap corresponding to offset of blocks including an AID of a terminal to which data is transmitted.

In addition, the block bitmap is positioned before bitmap information designating a block or a sub-block within an encoded TIM.

Specifically, referring to FIG. 4, a TIM bitmap according to an embodiment of the present invention may be encoded in units of blocks, a page ID may be displayed in an existing bitmap control, and a block bitmap for displaying whether encoding of a specific block is performed and encoded bitmap blocks encoded in units of blocks may be continuously displayed in the partial virtual bitmap.

In addition, a single encoded bitmap block includes a block control of 3 bits, a block offset of 5 bits, a fixed length part of 2 octets including a block bitmap of 1 octet, and a sub-block bitmap part having a variable length. Here, a block control field controls uses of the block bitmap and the sub-block bitmap field.

In addition, the block offset represents an offset value of a block.

In addition, the sub-block bitmap represents a position bitmap of a sub-block on which AID bit setting is performed.

In addition, the sub-blocks represent a position bitmap of an AID within a sub-block.

Specifically, referring to FIG. 5, a TIM bitmap according to an embodiment of the present invention may be encoded in units of blocks, a page ID and a block control may be included in an existing bitmap control, and a block bitmap for displaying whether encoding of a specific block is performed and encoded bitmap blocks encoded in units of blocks may be continuously displayed in the partial virtual bitmap.

In addition, a single encoded bitmap block includes a sub-block bitmap having a fixed length of 1 octet and sub-blocks having a variable length.

Here, the block control has a length of 3 bits and controls encoding of the sub-block bitmap and the sub-blocks.

In addition, the sub-block bitmap represents a position bitmap of a sub-block on which AID bit setting is performed.

In addition, the sub-block represents a position bitmap of an AID within a sub-block.

Specifically, a terminal may receive an encoded TIM from an AP, and first extract block bitmap information from the received encoded TIM, thereby determining whether bits for designating an encoded bitmap block including an AID of the terminal are set.

When the bits for designating the encoded bitmap block including the AID of the terminal are set in the extracted block bitmap information, the terminal decodes a bitmap of the encoded bitmap block including the AID of the terminal.

Alternatively, when the bits for designating the encoded bitmap block including the AID of the terminal are not set in the extracted block bitmap information, the terminal stops bitmap decoding of the encoded bitmap block for designating the block or the sub-block.

In addition, when the overall encoding blocks can be used in the same mode, a block control field and a block offset field of each of the encoded blocks may be omitted, as shown in FIG. 5.

According to an embodiment of the present invention, a terminal may extract block bitmap information from an encoded TIM received from the AP, and stop bitmap decoding of the encoded bitmap block for designating the block or the sub-block when bits for designating the encoded bitmap block including the AID of the terminal are not set in the extracted block bitmap information, thereby reducing power consumption of the low-power terminal.

Figure 6:
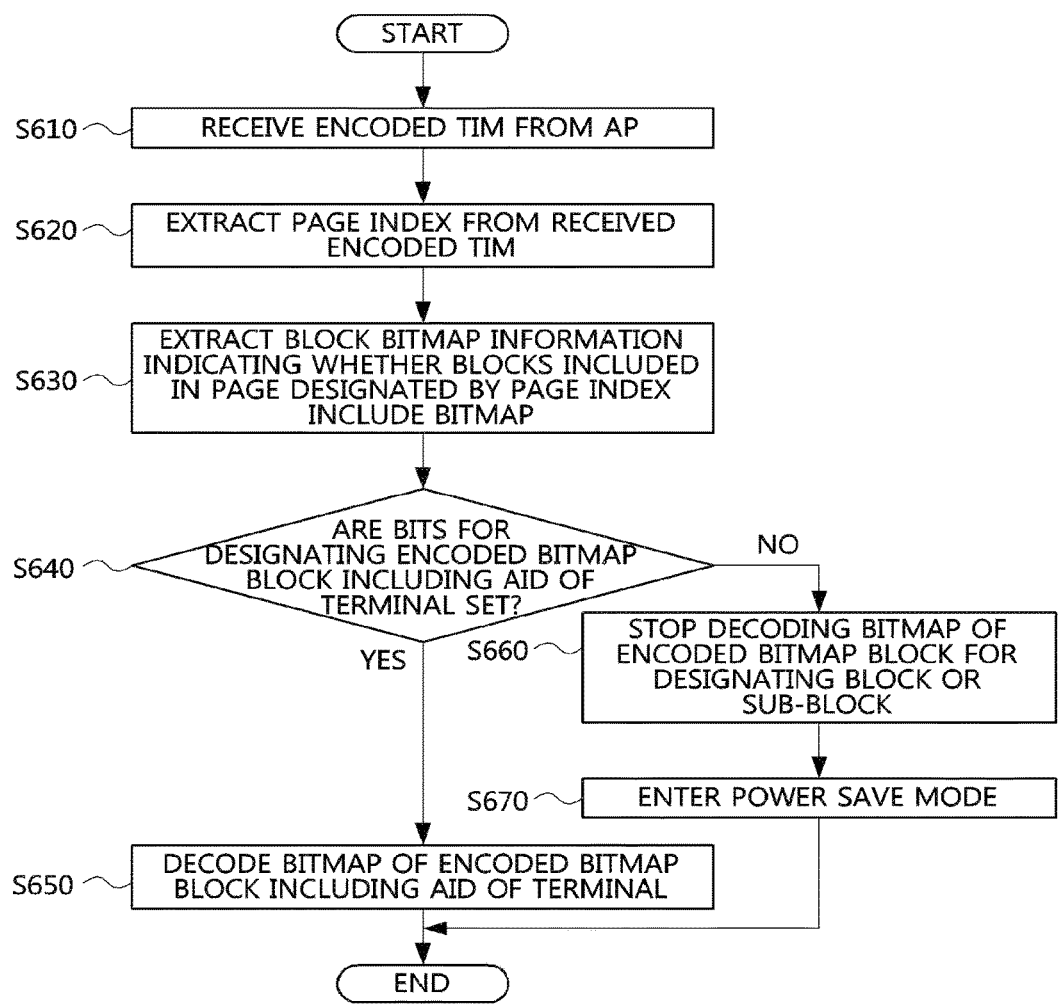
FIG. 6 is a flowchart showing a method of receiving encoded TIM information according to an embodiment of the present invention.

FIG. 6 is a flowchart showing a method of receiving encoded TIM information according to an embodiment of the present invention.

Referring to FIG. 6, in step S610, a terminal according to an embodiment of the present invention receives an encoded TIM from an AP.

In step S620, the terminal extracts a page index from the encoded TIM received through step S610.

Next, in step S630, the terminal extracts block bitmap information indicating whether blocks included in a page designated by the page index extracted through step S620 include a bitmap.

Here, the block bitmap information is positioned before bitmap information for designating a block or a sub-block within the encoded TIM.

In step S640, the terminal determines whether bits for designating an encoded bitmap block including an AID of the terminal are set in the extracted block bitmap information.

In step S650, when the bits for designating the encoded bitmap block including the AID of the terminal are set in the block bitmap information extracted through step S640, the terminal decodes a bitmap of the encoded bitmap block including the AID of the terminal.

Alternatively, in step S660, when the bits for designating the encoded bitmap block including the AID of the terminal are not set in the block bitmap information extracted through step S640, the terminal does not decode the bitmap of the encoded bitmap block for designating the block or the sub-block.

In addition, in step S670, the terminal enters a power save mode without decoding the bitmap of the encoded bitmap block for designating the block or the sub-block through step S660.

Here, in steps S660 and S670, for convenience of description, the stopping decoding of the bitmap of the encoded bitmap block for designating the block or the sub-block is first performed, but steps S660 and S670 may be performed in forward order, reverse order, or simultaneously.

According to the method for receiving encoded TIM information according to an embodiment of the present invention, the block bitmap information is positioned before the bitmap information for designating the block or the sub-block within the encoded TIM, and therefore, when bits for designating the encoded bitmap block including the AID of the terminal are not set in the block bitmap information, decoding of the bitmap of the encoded bitmap block for designating the block or the sub-block may stop, thereby reducing power consumption of a low-power terminal.

Figure 7:
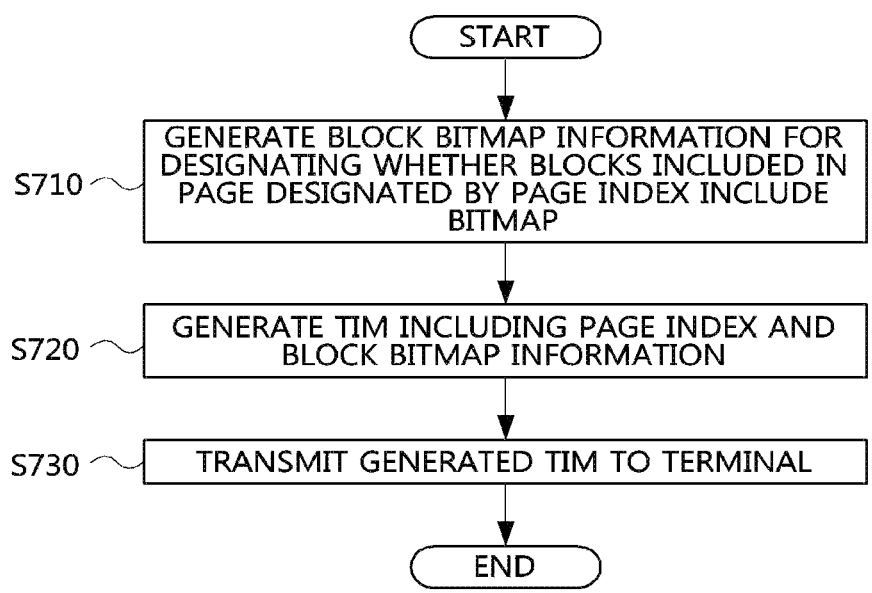
FIG. 7 is a flowchart showing a method of transmitting encoded TIM information according to an embodiment of the present invention.

FIG. 7 is a flowchart showing a method of transmitting encoded TIM information according to an embodiment of the present invention.

Referring to FIG. 7, in step S710, an AP generates block bitmap information for designating whether blocks included in a page designated by a page index include a bitmap.

Here, the block bitmap information is positioned before bitmap information for designating a block or a sub-block within an encoded TIM, so that a terminal can determine whether there is data to be transmitted to the terminal through only a front part of TIM elements of a DTIM beacon.

In step S720, the AP generates a TIM including the page index and the block bitmap information generated through step S710.

Next, in step S730, the AP transmits the TIM generated through step S720 to the terminal.

According to the method of transmitting the encoded TIM information according to an embodiment of the present invention, the block bitmap information is positioned before the bitmap information for designating the block or the sub-block within the encoded TIM, and therefore, when bits for designating the encoded bitmap block including the AID of the terminal are not set in the block bitmap information, decoding of the bitmap of the encoded bitmap block for designating the block or the sub-block may stop, thereby reducing power consumption of a low-power terminal.

In this specification, in order to be concise, exemplary embodiments of the present invention have been classified into the first, second and third exemplary embodiments. However, steps or functions of an exemplary embodiment may be combined with those of another exemplary embodiment to implement still another exemplary embodiment of the present invention.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method for processing a beacon frame by a terminal in a wireless local area network, the method comprising:
   receiving, by the terminal from an access point (AP), the beacon frame including a traffic indication map (TIM), a first bitmap and one or more second bitmap,
   wherein:

the TIM is based on a hierarchical structure that a page includes a plurality of blocks and a block includes a plurality of sub-blocks, and the first bitmap indicates presence of buffered data for each of one or more blocks, a second bitmap indicates presence of buffered data for each of one or more sub-blocks, and a sub-block indicates whether there is data for each of one or more terminals; and decoding the one or more blocks when the first bitmap indicates that there is a buffered data at the AP for the terminal.

2. The method according to claim 1,
wherein the one or more blocks are not decoded by the terminal when the first bitmap indicates that there is no buffered data at the AP for the terminal.

3. The method according to claim 1,
wherein the terminal enters a power save mode immediately when the first bitmap indicates that there is no buffered data at the AP for the terminal.

4. The method of claim 1,
wherein a maximum length of the first bitmap is 4 octets.

5. A method of transmitting a beacon frame by an access point (AP) in a wireless local area network, the method comprising:

generating the beacon frame including a traffic indication map (TIM), a first bitmap and one or more second bitmap, wherein:
the TIM is based on a hierarchical structure that a page includes a plurality of blocks and a block includes a plurality of sub-blocks, and the first bitmap indicates presence of buffered data for each of one or more blocks, a second bitmap indicates presence of buffered data for each of one or more sub-blocks, and a sub-block indicates whether there is data for each of one or more terminals; and transmitting the beacon frame,
wherein the one or more blocks are decoded by a terminal when the first bitmap indicates that there is a buffered data at the AP for the terminal.

6. A terminal for processing a beacon frame in a wireless local area network, the terminal comprising:

a transceiver; and
a processor,
wherein the processor is configured to:
receive, from an access point (AP), the beacon frame including a traffic indication map (TIM), a first bitmap and one or more second bitmap, wherein:
the TIM is based on a hierarchical structure that a page includes a plurality of blocks and a block includes a plurality of sub-blocks, and the first bitmap indicates presence of buffered data for each of one or more blocks, a second bitmap indicates presence of buffered data for each of one or more sub-blocks, and a sub-block indicates whether there is data for each of one or more terminals; and decode the one or more blocks when the first bitmap indicates that there is a buffered data at the AP for the terminal.

7. An access point (AP) for transmitting a beacon frame in a wireless local area network, the AP comprising:

a transceiver; and
a processor,
wherein the processor is configured to:
generate the beacon frame including a traffic indication map (TIM), a first bitmap and one or more second bitmap, wherein:
the TIM is based on a hierarchical structure that a page includes a plurality of blocks and a block includes a plurality of sub-blocks, and the first bitmap indicates presence of buffered data for each of one or more blocks, a second bitmap indicates presence of buffered data for each of one or more sub-blocks, and a sub-block indicates whether there is data for each of one or more terminals; and transmit the beacon frame,
wherein the one or more blocks are decoded by a terminal when the first bitmap indicates that there is a buffered data at the AP for the terminal.

* * * * *

UNITED STATES PATENT AND TRADEMARK OFFICE
CERTIFICATE OF CORRECTION

PATENT NO. : 10,341,951 B2
APPLICATION NO. : 15/959639
DATED : July 2, 2019
INVENTOR(S) : Jeong et al.

Page 1 of 1

It is certified that error appears in the above-identified patent and that said Letters Patent is hereby corrected as shown below:

In the Claims
Claim 1, Column 9, Line 1, after the word "structure" delete "that" and insert therefor --, wherein--.
Claim 5, Column 9, Line 29, after the word "structure" delete "that" and insert therefor --, wherein--.
Claim 6, Column 10, Line 8, after the word "structure" delete "that" and insert therefor --, wherein--.
Claim 7, Column 10, Line 29, after the word "structure" delete "that" and insert therefor --, wherein--.

Signed and Sealed this
Twenty-seventh Day of July, 2021

Drew Hirshfeld
*Performing the Functions and Duties of the
Under Secretary of Commerce for Intellectual Property and
Director of the United States Patent and Trademark Office*